(12) United States Patent
Park et al.

(10) Patent No.: US 11,407,355 B2
(45) Date of Patent: Aug. 9, 2022

(54) VEHICLE HEADLAMP AIMING ADJUSTMENT SYSTEM FOR MEASURING CHANGE IN SENSED AREA ON GROUND

(71) Applicants: HYUNDAI MOTOR COMPANY, Seoul (KR); KIA CORPORATION, Seoul (KR)

(72) Inventors: Sung Ho Park, Seoul (KR); Byoung Suk Ahn, Gwacheon-si (KR); Seung Sik Han, Hwaseong-si (KR); Ki Hong Lee, Seoul (KR); Jung Wook Lim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/342,115

(22) Filed: Jun. 8, 2021

(65) Prior Publication Data

US 2022/0176871 A1    Jun. 9, 2022

(30) Foreign Application Priority Data

Dec. 7, 2020 (KR) .................. 10-2020-0169779

(51) Int. Cl.
*B60Q 1/115* (2006.01)
*B60Q 1/00* (2006.01)
(52) U.S. Cl.
CPC ............ *B60Q 1/115* (2013.01); *B60Q 1/0023* (2013.01); *B60Q 2300/132* (2013.01); *B60Q 2300/136* (2013.01)

(58) Field of Classification Search
CPC .............. B60Q 1/115; B60Q 2300/132; B60Q 2300/134; B60Q 2300/136
See application file for complete search history.

(56) References Cited

U.S. PATENT DOCUMENTS 7,086,763 B2 *   8/2006   Okumura ............... B60Q 1/115
                                                         362/466
10,399,480 B2 *  9/2019   Kim ....................... B60Q 1/085

FOREIGN PATENT DOCUMENTS

KR    10-2010-0048381 A    5/2010

* cited by examiner

*Primary Examiner* — Robert J May
(74) *Attorney, Agent, or Firm* — Morgan, Lewis & Bockius LLP

(57) ABSTRACT

A vehicle headlamp aiming adjustment system includes a headlamp controller configured to adjust an emission direction of light emitted from a headlamp; a sensing unit configured to measure a sensing area on a ground and measure a change of the sensing area; and a controller configured to receive information about the sensing area measured by the sensing unit, compare the measured sensing area with a pre-stored reference area, and transmit a control signal to the headlamp controller such that the emission direction of light is adjusted in accordance with a change of the sensing area when the sensing area is different from the reference area. The above-describe vehicle headlamp aiming adjustment system can check an emission area of light of a headlamp and secure the driver's field of view by correcting the emission area.

16 Claims, 9 Drawing Sheets

VEHICLE HEADLAMP AIMING ADJUSTMENT SYSTEM FOR MEASURING CHANGE IN SENSED AREA ON GROUND

CROSS REFERENCE TO RELATED APPLICATION

The present application claims priority to Korean Patent Application No. 10-2020-0169779, filed Dec. 7, 2020 in the Korean Intellectual Property Office, the entire contents of which is incorporated herein for all purposes by this reference.

TECHNICAL FIELD

The present disclosure relates to a vehicle headlamp aiming adjustment system configured to adjust an emission direction of light emitted from a headlamp in accordance with the posture of a vehicle such that light is emitted to an accurate position.

BACKGROUND

In general, vehicle lamps include tail lamps, brake lamps that are turned on during braking, direction-indicator lamps, and the like.

Headlamps, in particular, emit light in the direction of movement of a traveling vehicle, thereby illuminating the front path. That is, headlamps emit light in the forward direction during nighttime traveling, thereby providing the driver with visual information. Accordingly, the front field of view is secured at night such that other vehicles and obstacles on roads can be identified, thereby securing safe traveling.

Conventional headlamps have a problem in that, if the vehicle is tilted by passengers on rear seats or by cargo in the trunk, or if the vehicle travels uphill/downhill, it is impossible to provide lighting appropriate for securing the driver's field of view.

The above descriptions regarding background arts are only for helping understanding of the background of the present disclosure, and are not to be considered by a person skilled in the art as corresponding to already-known prior arts.

SUMMARY

The present disclosure has been proposed to solve the above-mentioned problems, and it is an aspect of the present disclosure to provide a vehicle headlamp aiming adjustment system which adjusts the emission direction of light emitted from a headlamp according to the vehicle posture such that the driver's field of view is always secured.

A vehicle headlamp aiming adjustment system according to an aspect of the present disclosure may include: a headlamp controller configured to adjust an emission direction of light emitted from a headlamp; a sensing unit configured to measure a sensing area on a ground and measure a change of the sensing area; and a controller configured to receive information about the sensing area measured by the sensing unit, compare the measured sensing area with a pre-stored reference area, and transmit a control signal to the headlamp controller such that the emission direction of light is adjusted in accordance with a change of the sensing area when the sensing area is different from the reference area.

The sensing area of the sensing unit and the reference area of the controller may have the same shape of pattern, and when a pattern shape of the reference area is different from a pattern shape of the sensing area, the controller may transmit a control signal to the headlamp controller.

When the pattern shape of the sensing area moves forward or elongates forward with respect the pattern shape of the reference area, the controller may transmit a control signal to the headlamp controller such that the emission direction of light is corrected downward.

When the pattern shape of the sensing area moves rearward or shortens rearward with respect the pattern shape of the reference area, the controller may transmit a control signal to the headlamp controller such that the emission direction of light is corrected upward.

When the pattern shape of the sensing area sensed by the sensing unit moves left or increases in angle to the left with respect the pattern shape of the reference area, the controller may transmit a control signal to the headlamp controller such that the emission direction of light is corrected to the left.

When the pattern shape of the sensing area moves left or increases in angle to the left with respect the pattern shape of the reference area, the controller may transmit a control signal to the headlamp controller such that the emission direction of light from a left headlamp is corrected downward and the emission direction of light from a right headlamp is corrected upward.

When the pattern shape of the sensing area moves right or increases in angle to the right with respect the pattern shape of the reference area, the controller mat transmit a control signal to the headlamp controller such that the emission direction of light from a left headlamp is corrected upward and the emission direction of light from a right headlamp is corrected downward.

When the pattern shape of the sensing area sensed by the sensing unit moves right or increases in angle to the right with respect the pattern shape of the reference area, the controller may transmit a control signal to the headlamp controller such that the emission direction of light is corrected to the right.

The sensing unit may be configured to form a sensing area under a vehicle.

The sensing unit may be configured to form a sensing area forward in a traveling direction of a vehicle.

The controller may further receive information of a traveling speed of a vehicle and may derive an arrival time for the vehicle to arrive at a location where the sensing area and the reference area are different on the basis of the traveling speed such that the emission direction of light is adjusted at the derived arrival time by the headlamp controller.

The sensing unit may include a first sensing unit forming a first sensing area forward in a traveling direction of a vehicle and a second sensing unit forming a second sensing area under the vehicle. A first reference area corresponding to the first sensing area and a second reference area corresponding to the second sensing area may be stored in advance in the controller.

When a vehicle is stopped, the controller may first compare the second sensing area and the second reference area with each other and may transmit a control signal to the headlamp controller such that the emission direction of light is adjusted when the second sensing area changes with respect to the second reference area.

When the vehicle is traveling, the controller may derive the amount of emission direction of light to be adjusted due to a change of the first sensing area relative to the first reference area, and may correct the derived emission direction of light when the second sensing area changes with respect to the second reference area.

The controller may further receive information of a traveling speed of a vehicle and may derive an arrival time for the vehicle to arrive at a location where the first sensing area and the first reference area are different on the basis of the traveling speed such that the emission direction of light is adjusted by the headlamp controller before the arrival time.

The vehicle headlamp aiming adjustment system having the above-described configuration identifies the light emission area of the headlamp through the sensing unit as the vehicle posture changes and corrects the light emission area accordingly such that the driver's field of view is always secured, thereby securing driving stability.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

A vehicle headlamp aiming adjustment system according to an exemplary embodiment of the present disclosure is described hereafter with reference to the accompanying drawings.

Figure 1:
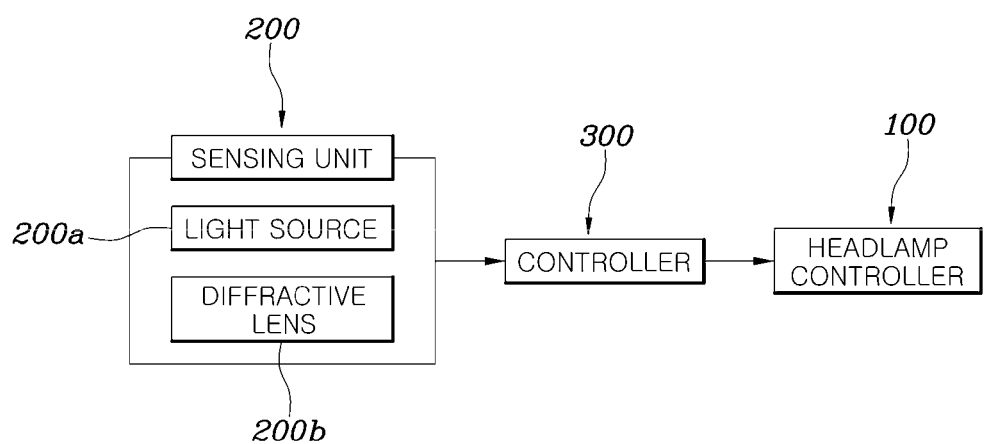
FIG. 1 is a diagram showing the configuration of a vehicle headlamp aiming adjustment system according to an embodiment of the present disclosure.
Figure 4:
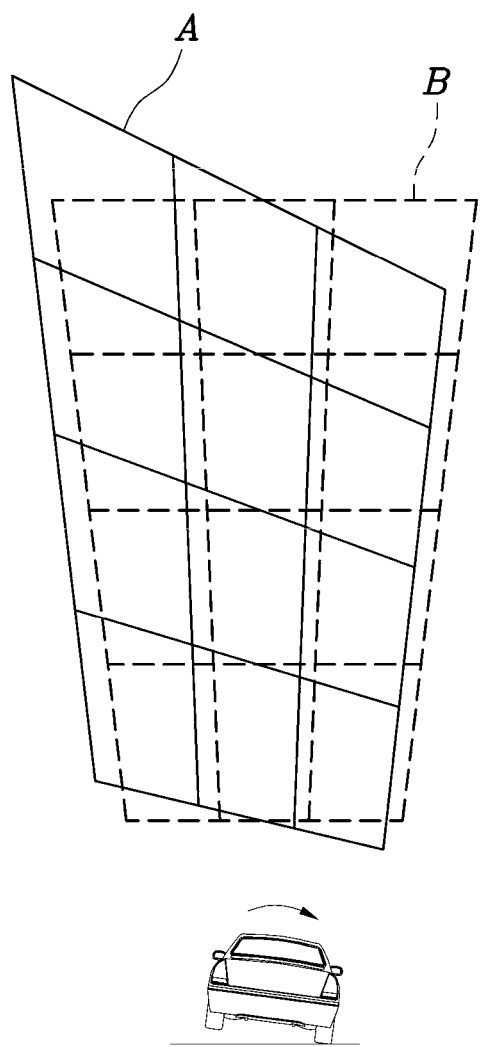
Figure 5:
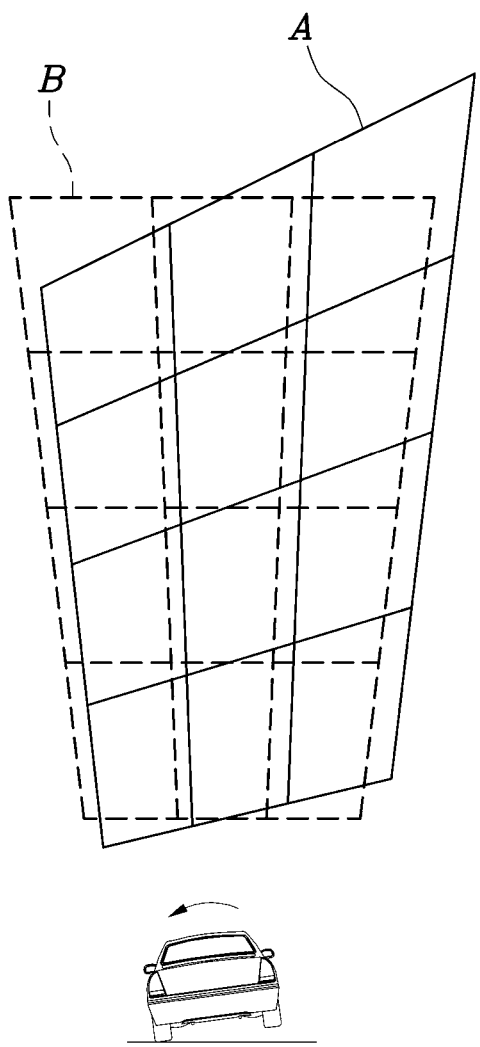
Figure 6:
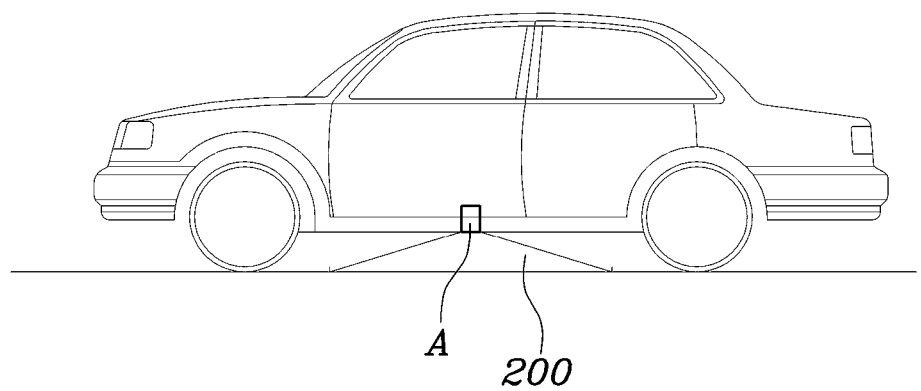
FIGS. 6 and 7 are diagrams showing an installation position of a sensing unit in the vehicle headlamp aiming adjustment system shown in FIG. 1.
Figure 7:
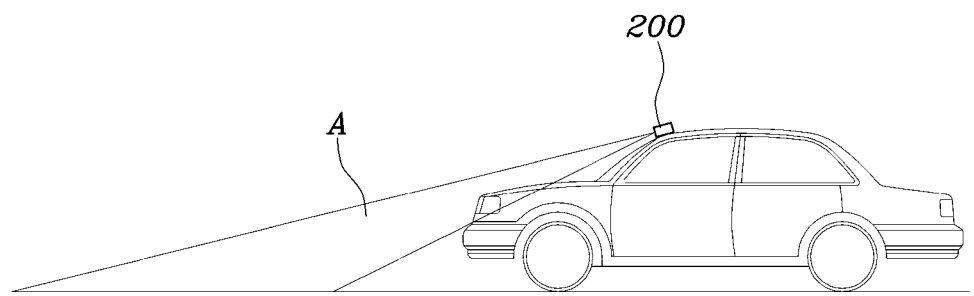
Figure 8:
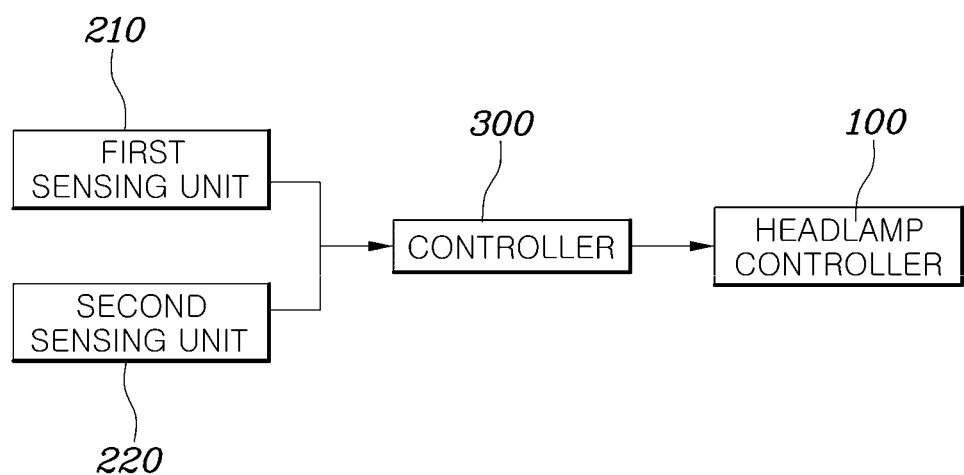
FIG. 8 is a diagram showing the configuration of a vehicle headlamp aiming adjustment system according to another embodiment of the present disclosure.
Figure 9:
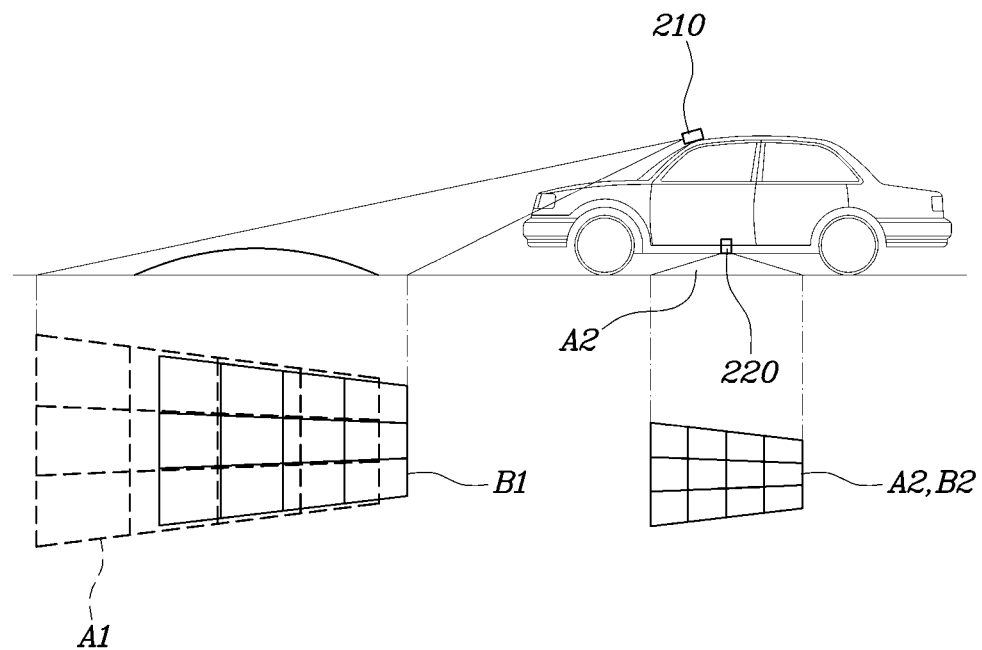
FIG. 9 is a diagram showing an installation position of a sensing unit in the vehicle headlamp aiming adjustment system shown in FIG. 8.

FIG. 1 is a diagram showing the configuration of a vehicle headlamp aiming adjustment system according to an embodiment of the present disclosure, FIGS. 2 to 5 are diagrams showing a change of a sensing area according to the posture of a vehicle in the vehicle headlamp aiming adjustment system shown in FIG. 1, FIGS. 6 and 7 are diagrams showing an installation position of a sensing unit in the vehicle headlamp aiming adjustment system shown in FIG. 1, FIG. 8 is a diagram showing the configuration of a vehicle headlamp aiming adjustment system according to another embodiment of the present disclosure, and FIG. 9 is a diagram showing an installation position of a sensing unit in the vehicle headlamp aiming adjustment system shown in FIG. 8.

An vehicle headlamp aiming adjustment system according to the present disclosure, as shown in FIG. 1, includes: a headlamp controller 100 adjusting the emission direction of light emitted from a headlamp; a sensing unit 200 forming a sensing area A on the ground and measuring a change of the sensing area A; and a controller 300 receiving information about the sensing area A measured by the sensing unit, comparing the measured sensing area A with a pre-stored reference area B, and transmitting a control signal to the headlamp controller 100 such that the emission direction of light is adjusted in accordance with a change of the sensing area A when the sensing area A is different from the reference area B.

The headlamp is configured to adjust the emission direction of light by driving an actuator. The actuator is operated in response to a control signal from the headlamp controller 100, whereby the emission direction of light is changed.

The sensing unit 200 may be a depth sensor. That is, the sensing unit 200 includes a light source 200a emitting infrared light, and a diffractive lens 200b sending the infrared light emitted from the light source 200a to a sensing area A having a pattern. Accordingly, the sensing unit 200 projects infrared light having a structured pattern to the ground and finds out a change of the pattern through an image sensor, thereby being able to find out the state of the road surface. LiDar, Time of Flight (TOF), or the like may be applied to the depth sensor, and the depth sensor can three-dimensionally recognize the state of a road surface and an obstacle, thereby being able to precisely adjust the emission direction of light through the headlamp.

The controller 300 receives information about the sensing area A from the sensing unit 200, and transmits a control signal to the headlamp controller 100 such that the emission direction of light from the headlamp is adjusted. A reference area B for the sensing area A is stored in the controller 300 when the vehicle including the headlamp is in the normal state. That is, the reference area B may be stored when a vehicle is delivered from a warehouse and it is possible to analyze the posture of the vehicle by checking the difference between the sensing area A and the reference area B measured by the sensing unit 200 on the basis of the reference area B.

Accordingly, the controller 300 compares the sensing area measured by the sensing unit 200 with the pre-stored reference area B, and transmits a control signal to the headlamp controller 100 such that the emission direction of light is adjusted in accordance with a change of the sensing area A when the sensing area A and the reference area B are different. That is, the controller 300 checks the posture of the vehicle due to the difference between the sensing area A and the reference area B and transmits a control signal such that the emission area of light that is changed in accordance with a change of the posture of the vehicle is corrected into the normal emission area of light, whereby the forward field of view is secured.

Describing the present disclosure in detail, the sensing area A of the sensing unit 200 and the reference area B of the controller 300 may have the same shape of pattern. Accordingly, when the posture of a vehicle is stable, the pattern of the reference area B and the pattern of the sensing area A are the same. When the posture of a vehicle is unstable, the pattern of the sensing area A changes and does not coincide with the pattern of the reference area B. Accordingly, when the pattern shape of the reference area B is different from the pattern shape of the sensing area A, the controller 300 transmits a control signal to the headlamp controller 100 such that the emission direction of light from the headlamp is adjusted. Various shapes may be applied to the pattern shapes of the sensing area A and the reference area B, but several mesh patterns may be provided so that a gap is not generated between patterns and it is possible to intuitively know a change in pattern.

In detail, when the pattern shape of the sensing area A moves forward or elongates forward with respect the pattern shape of the reference area B, the controller 300 transmits a control signal to the headlamp controller 100 such that the emission direction of light is corrected downward.

Figure 2:
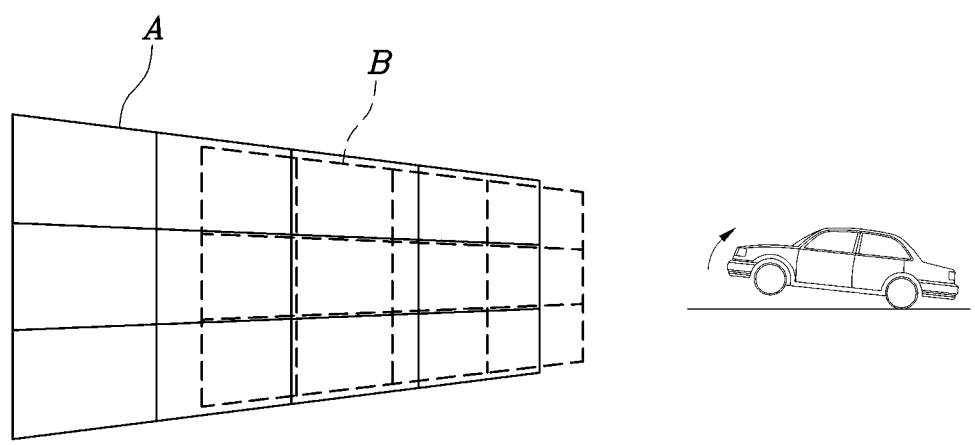
FIGS. 2 to 5 are diagrams showing a change of a sensing area according to the posture of a vehicle in the vehicle headlamp aiming adjustment system shown in FIG. 1.

That is, as can be seen in FIG. 2, when the pattern shape input through the sensing unit 200 moves forward or elongates forward with respect to the pattern shape of the reference area B stored in the controller 300, the controller 300 determines that the posture of a vehicle has changed such that the front is lifted. Accordingly, the controller 300 transmits a control signal to the headlamp controller 100 such that the emission direction of the light emitted upward from the headlamp is corrected, whereby the emission direction of the light is changed downward. As described above, the controller 300 checks the posture of a vehicle by deriving a variation of inclination of the vehicle due to a change of the pattern of the sensing area A measured by the sensing unit 200, derives an emission direction for correcting the emission area of light changed due to a change of the posture of the vehicle, and transmits a control signal to the headlamp controller 100. Accordingly, the headlamp controller 100 controls the actuator in response to the control signal, whereby the emission direction of the light emitted from the headlamp is adjusted such that the light travels to the normal position.

When the pattern shape of the sensing area A moves rearward or shortens rearward with respect the pattern shape of the reference area B, the controller 300 transmits a control signal to the headlamp controller 100 such that the emission direction of light is corrected upward.

Figure 3:
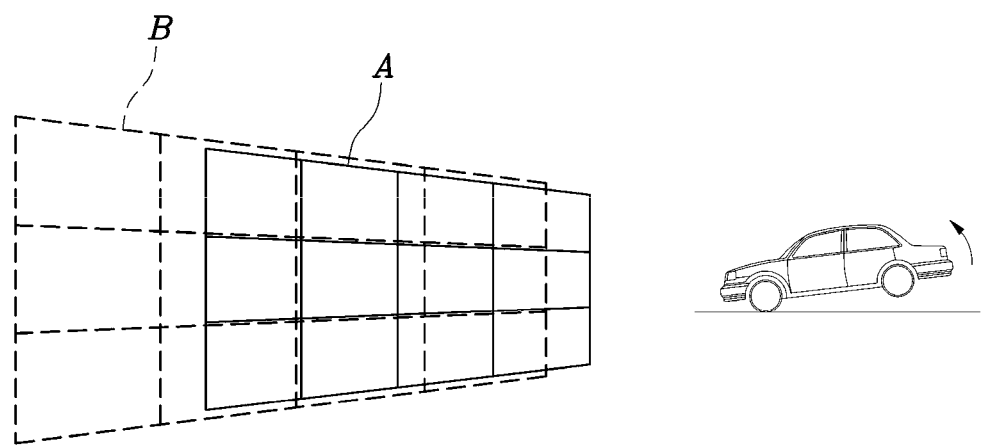

That is, as can be seen in FIG. 3, when the pattern shape input through the sensing unit 200 moves rearward or shortens rearward with respect to the pattern shape of the reference area B stored in the controller 300, the controller 300 determines that the posture of a vehicle has changed such that the rear is lifted. Accordingly, the controller 300 transmits a control signal to the headlamp controller 100 such that the emission direction of the light emitted downward from the headlamp is corrected, whereby the emission direction of the light is changed upward.

When the pattern shape of the sensing area A sensed by the sensing unit 200 moves left or increases in angle to the left with respect the pattern shape of the reference area B, the controller 300 transmits a control signal to the headlamp controller 100 such that the emission direction of light is corrected to the left.

That is, as can be seen in FIG. 4, when the pattern shape input through the sensing unit 200 moves left or increases in angle to the left with respect to the pattern shape of the reference area B stored in the controller 300, the controller 300 determines that the posture of a vehicle has changed such that the left side is lifted. Accordingly, the controller 300 transmits a control signal to the headlamp controller 100 such that the emission direction of the light emitted to the left from the headlamp is corrected, whereby the emission direction of the light is corrected to the left.

When the left side of a vehicle is lifted, the left pattern of the sensing area A is moved forward or changed forward and the right pattern is moved rearward or changed rearward. Accordingly, when the pattern shape of the sensing area A moves left or increases in angle to the left with respect the pattern shape of the reference area B, the controller 300 transmits a control signal to the headlamp controller 100 such that the emission direction of light from the left headlamp is corrected downward and the emission direction of light from the right headlamp is corrected upward. That is, when the left side of a vehicle is lifted, the emission area of the light from the left headlamp expands and the emission direction of the light from the right headlamp is reduced.

Accordingly, the headlamps are corrected to the left, the emission direction of the light from the left headlamp is corrected downward, and the emission direction of the light from the right headlamp is corrected upward. As described above, the emission direction of light emitted from headlamps is adjusted, the light emitted from the left and right headlamps can travel to the normal position.

When the pattern shape of the sensing area A sensed by the sensing unit 200 moves right or increases in angle to the right with respect the pattern shape of the reference area B, the controller 300 transmits a control signal to the headlamp controller 100 so that the emission direction of light is corrected to the right.

That is, as can be seen in FIG. 5, when the pattern shape of the sensing area A input through the sensing unit 200 moves right or increases in angle to the right with respect to the pattern shape of the reference area B stored in the controller 300, the controller 300 determines that the posture of a vehicle has changed such that the right side is lifted. Accordingly, the controller 300 transmits a control signal to the headlamp controller 100 such that the emission direction of the light emitted to the right from the headlamp is corrected, whereby the emission direction of the light is adjusted to the right.

When the right side of a vehicle is lifted, the right pattern of the sensing area A is moved forward or changed forward and the left pattern is moved rearward or changed rearward. Accordingly, when the pattern shape of the sensing area A moves right or increases in angle to the right with respect the pattern shape of the reference area B, the controller 300 transmits a control signal to the headlamp controller 100 such that the emission direction of light from the left headlamp is corrected upward and the emission direction of light from the right headlamp is corrected downward. That is, when the right side of a vehicle is lifted, the emission area of the light from the right headlamp expands and the emission direction of the light from the left headlamp reduces. Accordingly, the headlamps are corrected to the right, the emission direction of the light from the left headlamp is corrected upward, and the emission direction of the light from the right headlamp is corrected downward.

As shown in FIG. 6, the sensing unit 200 may be configured to form a sensing area A under a vehicle. When the sensing unit 200 is disposed at the lower portion of a vehicle and forms a sensing area A under the vehicle and the posture of the vehicle is changed, the sensing area A is also changed, whereby it is possible to immediately find out the difference between the sensing area A and the reference area B.

As another embodiment, as shown in FIG. 7, the sensing unit 200 may be configured to form a sensing area A forward in the traveling direction of a vehicle. That is, the sensing unit 200 may be installed to form a sensing area A ahead of a vehicle and may find out the road surface state in the traveling direction. Since the road surface state in the traveling direction is checked in advance, it is possible to more quickly adjust the emission direction of light from the headlamp in accordance with the road surface state.

In particular, when the sensing unit 200 is configured to form a sensing area A forward in the traveling direction of a vehicle, the controller 300 further receives the information of the traveling speed of the vehicle and derives the arrival time for the vehicle to arrive at a location where the sensing area A and the reference area B are different on the basis of the traveling speed. That is, since the sensing unit 200 is configured to form a sensing area A forward in the traveling direction of a vehicle, the controller 300 can find out in advance the location where the measured sensing area A is different from the reference area B. Further, the controller 300 derives the arrival time for the vehicle to arrive at a location where the sensing area A and the reference area B are different on the basis of the traveling speed, thereby being able to adjust the emission direction of light when the vehicle arrives at the location.

As another embodiment, as shown in FIGS. 8 and 9, the sensing unit 200 may include a first sensing unit 210 forming a first sensing area A forward in the traveling direction of a vehicle and a second sensing unit 220 forming a second sensing area A2 under the vehicle. Since the sensing unit 200 includes the first sensing unit 210 and the second sensing unit 220, and the first sensing unit 210 and the second sensing unit 220 form sensing areas forward and under the vehicle, it is possible to more precisely adjust the emission direction of the headlamp by combining the information from the sensing units. Accordingly, a first reference area B1 corresponding to the first sensing area A1 and a second reference area B2 corresponding to the second sensing area A2 are stored in advance in the controller 300.

In detail, when a vehicle is stopped, the controller 300 first compares the second sensing area A2 and the second reference area B2 with each other, and transmits a control signal to the headlamp controller 100 such that the emission direction of light is changed when the second sensing area A2 changes with respect to the second reference area B2. That is, since the second sensing unit 220 forms the second sensing area A2 under the vehicle, when the posture of the vehicle changes, the second sensing area A2 also changes. In particular, since the second sensing unit 220 intuitively checks the state of the road on which the vehicle is currently positioned, when the vehicle is stopped, the controller 300 first compares the second sensing area A2 measured by the second sensing unit 220 with the second reference area B2. Accordingly, when the vehicle is stopped and the second reference area B2 and the second sensing area A2 do not coincide with each other, the controller 300 transmits a control signal to the headlamp controller 100 such that the emission direction of light is changed in accordance with the difference between the second reference area B2 and the second sensing area A2.

When the vehicle is traveling, the controller 300 derives the amount of emission direction of light to be changed due to a change of the first sensing area A1 relative to the first reference area B1, and corrects the derived emission direction of light when the second sensing area A2 changes with respect to the second reference area B2. As described above, the amount of emission direction of light to be adjusted is found out in advance by finding out in advance a road surface state in the traveling direction by comparing the first sensing area A1 measured by the first sensing unit 210 and the first reference area B1. Further, when a difference between the second sensing area A2 measured by the second sensing unit 220 and the second reference area B2 is generated as the vehicle travels, the amount of emission direction of light derived by comparing the first sensing area A1 and the first reference area B1 is corrected such that the emission direction of light is more precisely adjusted.

Further, the controller 300 further receives the information of the traveling speed of the vehicle and derives the arrival time for the vehicle to arrive at a location where the first sensing area A1 and the first reference area B1 are different on the basis of the traveling speed such that the emission direction of light is adjusted by the headlamp controller 100 before the arrival time. That is, since the first sensing unit 210 is configured to form the first sensing area A1 forward in the traveling direction of a vehicle, the controller 300 can find out in advance the location where the first sensing area A1 measured by the first sensing unit 210 and the first reference area B1 are different. Accordingly, the controller 300 derives the arrival time for the vehicle to arrive at a location where the first sensing area A1 and the first reference area B1 are different on the basis of the traveling speed and makes the emission direction of light be adjusted at a set time that is set earlier than the arrival time. Accordingly, the emission direction of light is adjusted immediately before the posture of the vehicle is changed, so the headlamp is controlled early, and accordingly, it is possible to secure the forward field of view. Thereafter, when a difference is generated between the second sensing area A2 measured by the second sensing unit 220 and the second reference area B2, the amount of emission direction to be adjusted which is derived by comparing the first sensing area A1 and the first reference area B1 is corrected such that the emission direction of light can be more precisely adjusted.

The vehicle headlamp aiming adjustment system having the configuration described above measures the light emission area of a headlamp according to a change of a posture of a vehicle through a sensing unit and the driver's field of view is always secured by correcting the emission area of light, whereby driving stability is secured.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A vehicle headlamp aiming adjustment system of a vehicle comprising:
   a headlamp controller configured to adjust an emission direction of light emitted from a headlamp;
   a sensing unit configured to measure a sensing area on a ground and measure a change of the sensing area; and
   a controller configured to:
      receive information about the sensing area measured by the sensing unit,
      compare the measured sensing area with a pre-stored reference area, and
      transmit a control signal to the headlamp controller such that the emission direction of light is adjusted in accordance with a change of the sensing area when the sensing area is different from the reference area,
   wherein the sensing area of the sensing unit and the reference area of the controller have the same shape of pattern, and
   when a pattern shape of the reference area is different from a pattern shape of the sensing area, the controller transmits a control signal to the headlamp controller.

2. The vehicle headlamp aiming adjustment system of claim 1, wherein, when the pattern shape of the sensing area moves forward or elongates forward with respect to the pattern shape of the reference area, the controller transmits a control signal to the headlamp controller such that the emission direction of light is changed to be downward.

3. The vehicle headlamp aiming adjustment system of claim 1, wherein, when the pattern shape of the sensing area moves rearward or shortens rearward with respect to the pattern shape of the reference area, the controller transmits a control signal to the headlamp controller such that the emission direction of light is changed to be upward.

4. The vehicle headlamp aiming adjustment system of claim 1, wherein, when the pattern shape of the sensing area sensed by the sensing unit moves left or increases in angle to the left with respect to the pattern shape of the reference area, the controller transmits a control signal to the headlamp controller such that the emission direction of light is changed to the left.

5. The vehicle headlamp aiming adjustment system of claim 1, wherein, when the pattern shape of the sensing area moves left or increases in angle to the left with respect to the pattern shape of the reference area, the controller transmits a control signal to the headlamp controller such that the emission direction of light from a left headlamp is changed to be downward and the emission direction of light from a right headlamp is changed to be upward.

6. The vehicle headlamp aiming adjustment system of claim 1, wherein when the pattern shape of the sensing area sensed by the sensing unit moves right or increases in angle to the right with respect to the pattern shape of the reference area, the controller transmits a control signal to the headlamp controller such that the emission direction of light is changed to the right.

7. The vehicle headlamp aiming adjustment system of claim 1, wherein, when the pattern shape of the sensing area moves right or increases in angle to the right with respect to the pattern shape of the reference area, the controller transmits a control signal to the headlamp controller such that the emission direction of light from a left headlamp is changed to be upward and the emission direction of light from a right headlamp is changed to be downward.

8. The vehicle headlamp aiming adjustment system of claim 1, wherein the sensing unit is configured to measure a sensing area under the vehicle.

9. The vehicle headlamp aiming adjustment system of claim 1, wherein the sensing unit is configured to measure a sensing area forward in a traveling direction of the vehicle.

10. The vehicle headlamp aiming adjustment system of claim 9, wherein the controller further receives information of a traveling speed of the vehicle and derives an arrival time for the vehicle to arrive at a location where the sensing area and the reference area are different on the basis of the traveling speed such that the emission direction of light is adjusted at the derived arrival time by the headlamp controller.

11. The vehicle headlamp aiming adjustment system of claim 1, wherein the sensing unit includes a first sensing unit measuring a first sensing area forward in a traveling direction of the vehicle and a second sensing unit measuring a second sensing area under the vehicle, and
a first reference area corresponding to the first sensing area and a second reference area corresponding to the second sensing area are stored in advance in the controller.

12. The vehicle headlamp aiming adjustment system of claim 11, wherein, when the vehicle is stopped, the controller first compares the second sensing area and the second reference area with each other, and transmits a control signal to the headlamp controller such that the emission direction of light is adjusted when the second sensing area changes with respect to the second reference area.

13. The vehicle headlamp aiming adjustment system of claim 11, wherein, when the vehicle is traveling, the controller derives an amount of emission angle of light to be adjusted due to a change of the first sensing area relative to the first reference area, and adjusts the amount of emission angle of light when the second sensing area changes with respect to the second reference area.

14. The vehicle headlamp aiming adjustment system of claim 13, wherein the controller further receives the information of a traveling speed of the vehicle and derives an arrival time for the vehicle to arrive at a location where the first sensing area and the first reference area are different on the basis of the traveling speed such that the emission direction of light is adjusted by the headlamp controller before the arrival time.

15. A vehicle headlamp aiming adjustment system of a vehicle comprising:
a headlamp controller configured to adjust an emission direction of light emitted from a headlamp;
a sensing unit configured to measure a sensing area on a ground and measure a change of the sensing area; and
a controller configured to:
receive information about the sensing area measured by the sensing unit,
compare the measured sensing area with a pre-stored reference area, and
transmit a control signal to the headlamp controller such that the emission direction of light is adjusted in accordance with a change of the sensing area when the sensing area is different from the reference area,
wherein the sensing unit is configured to measure a sensing area under the vehicle.

16. A vehicle headlamp aiming adjustment system of a vehicle comprising:
a headlamp controller configured to adjust an emission direction of light emitted from a headlamp;
a sensing unit configured to measure a sensing area on a ground and measure a change of the sensing area; and
a controller configured to:
receive information about the sensing area measured by the sensing unit,
compare the measured sensing area with a pre-stored reference area, and
transmit a control signal to the headlamp controller such that the emission direction of light is adjusted in accordance with a change of the sensing area when the sensing area is different from the reference area,
wherein the sensing unit includes a first sensing unit measuring a first sensing area forward in a traveling direction of the vehicle and a second sensing unit measuring a second sensing area under the vehicle, and
a first reference area corresponding to the first sensing area and a second reference area corresponding to the second sensing area are stored in advance in the controller.

* * * * *